(12) United States Patent
De Filippis et al.

(10) Patent No.: US 7,042,121 B2
(45) Date of Patent: May 9, 2006

(54) COOLING FAN WITH ELECTRIC MOTOR

(75) Inventors: Pietro De Filippis, Milan (IT); Markus Egerland, Gerbrunn (DE); Detlef Kemmer, Alterheim (DE); Paul Stephen McLennan, London (CA); Harald Redelberger, Kürnach (DE)

(73) Assignee: Siemens Aktiengesellschaft, Munich (DE)

( * ) Notice: Subject to any disclaimer, the term of this patent is extended or adjusted under 35 U.S.C. 154(b) by 4 days.

(21) Appl. No.: 11/165,190

(22) Filed: Jun. 24, 2005

(65) Prior Publication Data
US 2006/0022529 A1 Feb. 2, 2006

(30) Foreign Application Priority Data
Jul. 30, 2004 (EP) .................................. 04018134

(51) Int. Cl.
*H02K 11/00* (2006.01)
(52) U.S. Cl. .............................. 310/63; 310/62; 310/52; 310/58; 310/64
(58) Field of Classification Search .................. 310/52, 310/53, 58, 59, 61, 62, 63, 64
See application file for complete search history.

(56) References Cited

U.S. PATENT DOCUMENTS 6,682,320 B1 1/2004 Gold et al.

2002/0187059 A1 12/2002 Gold et al.

FOREIGN PATENT DOCUMENTS

DE 100 44 066 A1 4/2002
EP 1 050 682 A2 11/2000

OTHER PUBLICATIONS

Derwent Abstract—DE-100 44 066 A1; Apr. 4, 2002; Electric ventilator has cooling body for control unit mounted on at least one ventilation opening of common housing for electric motor for driving fan and control unit for controling motor; Stribel GmbH, D-72636 Frickenhausen (Germany).

*Primary Examiner*—Darren Schuberg
*Assistant Examiner*—Leda Pham
(74) *Attorney, Agent, or Firm*—Siemens AG; J. Eisenberg (57) ABSTRACT

The invention relates to a cooling fan for use in a motor vehicle. To achieve improved cooling of an electric motor it is proposed that the motor housing enclosing the electric motor be used as a heat sink for emitting waste heat into a cooling air flow. The cooling air flow for cooling the electric motor is routed here through the interior of the motor housing and subsequently along the outside of the motor housing over cooling elements in the areas of the air inlet openings and in the area or an air exit gap between fan wheel hub and front part of the motor housing. The cooling air flow is created in this case by the fan wheel hub of the fan wheel driven by the electric motor.

10 Claims, 6 Drawing Sheets

COOLING FAN WITH ELECTRIC MOTOR

BACKGROUND OF THE INVENTION

The invention relates to a cooling fan with an electric motor drive, especially for use as a cooling fan in a motor vehicle.

The cooling fan is taken to mean the fan system which essentially consists of the fan wheel with fan wheel hub and fan blades and an electric motor to drive the fan. Usually this type of cooling fan is mounted for example in a frame provided for the purpose which is fixed in the engine compartment of a motor vehicle or such like.

For safe operation of electric motors it is necessary for the components and materials used not to become overheated under specific operating conditions. It is therefore necessary to ensure that no overheating occurs during the operation of the electric motor with maximum power dissipation. If this requirement is not observed the result can be a reduction in the lifetime of the electric motor or a total failure of the electric motor. The cooling of the electric motor, that is the removal of the waste heat generated by the electrical components, especially in the commutator, the coil and in the iron components to which electromagnetic forces are applied, is of major significance.

Today's electric motors are equipped with electronics for brushless commutation or speed regulation/controlling for example, which may also release large amounts of waste heat. This electronics represents the components of an electric motor which are critical from the thermal standpoint and increases the cooling requirements.

Use as a drive unit of a cooling fan for the internal combustion engine in a motor vehicle, as a result of the extreme changes in environmental conditions, such as operation during summer and winter for example also increases the requirements for managing the heat produced by the electric motor used.

With electric motors used to drive fans routing an air flow through the electric motor by generating and using a difference in pressure between air inlet openings and air outlet openings of the electric motor housing is known.

Thus for example publication EP 1 050 682 A2 shows a cooling fan with electric motor. This involves an electric motor with an internal wound stator and a permanently excited external rotor. The motor electronics is located in a chamber on the outside of what is known as the stator foot of the electric motor and is covered by a separate cover. The fan wheel hub is embodied in the form of a bowl and features air scoops on its inside which generate a cooling air flow. The cooling air flow is directed sideways past external cooling ribs of the stator foot into the interior of the electric motor housing and leaves the housing on the opposite side through openings in the floor of the dish-shaped external rotor and the air gap between the fan hub and the external rotor.

The electronics is encapsulated by enclosing it under a separate cover and the heat losses generated can only be removed by heat conductance via the stator foot. The heat conduction path from the electronics to the cooling fins of the stator foot is comparatively long in this case. The cooling air flow generated can only accept the heat energy generated by the electronics at one point over a comparatively short path past the cooling fins. The heat losses generated by the stator winding can only be removed via the cooling air flow since the air gap between stator and rotor practically operates as a heat isolator. Thus practically no heat can be removed via the external surfaces of the electric motor. These design features make effective removal of heat losses more difficult In addition the arrangement of the electronics requires an additional housing cover which encloses the mounting chamber.

A further electrical fan, especially for motor vehicles, is disclosed in Application DE 100 44 066 A1. In the electrical drive motor used here the electronic control unit used to control the fan motor is housed with this in a shared housing. A cooling air flow which can be generated by the fan wheel is also routed through ventilation openings of the housing. To cool the control unit this is equipped with at least one heat sink which is attached to the rear end plate arranged in a ventilation opening of the housing and thus cooled by the cooling air flow. This requires separate heat sinks and mounting connections between heat sinks, control unit circuit board and bearing cover of the housing. A additional heat removal on the outside of the motor housing cannot be undertaken here either in any of the embodiments since the cooling air flow only passes over the components generating the individual heat once.

SUMMARY OF THE INVENTION

The object of the invention is to improve the cooling of an electric motor and thereby to increase the thermal robustness in relation to changing and extreme environmental conditions, as are to be encountered for example in the day-to-day use in a motor vehicle. Simultaneously the effort involved in construction, as well as manufacturing and installation, is to be reduced.

In accordance with the invention this object is achieved by a cooling fan with the features of claim 1 or by a method in accordance with claim 10. Advantageous embodiments of the invention are described in the subclaims and in the embodiments relating to the drawings.

The improved cooling of the electric motor achieved allows the same performance in a smaller space or a higher performance in the same space. At the same time a longer service life of the electric motor is ensured by greater thermal robustness. Failures of the electric motor resulting from overheating are avoided. In addition the number of individual parts of the fan is reduced and manufacturing and installation are also simplified.

The invention is based on the basic idea of improving the cooling of an electric motor and reducing the constructional and installation effort by embodying the motor housing surrounding the electric motor so that it can also be used as a heat sink to remove heat losses into an air flow and thus to cool the components generating heat. To this end the cooling air flow for cooling the electric motor is first routed past the cooling elements arranged on the air intake side through the interior of the motor housing and then through an air gap formed between a bowl-shaped fan wheel hub and the motor housing to the outside of the motor housing past cooling elements arranged on the air outlet side. The air flow here is generated by a difference in pressure which is created by the fan wheel driven by the electric motor between air inlet side and air outlet side.

The routing of the cooling air flow resulting from the pressure difference includes both the case where the heat losses from the motor housing are emitted into a cooling air flow directed in and through the inside of the motor and also the case in which the cooling air flow is routed outside along the motor housing, where it removes additional heat losses from the electric motor. The Increased cooling requirements of the motor electronics are fulfilled by the cooling air flow being directed a number of times past the part of the motor housing which conducts the heat from the motor electronics. At the same time the outlay in parts and installation is reduced by using parts of the housing as heat sinks.

A motor electronics which for example comprises power semi-conductors, coils and electrolytic capacitors is connected echanically and thermally for directly conducting heat to a rear part of the motor housing facing away from the fan wheel, preferably the rear side end housing. The heat losses generated by the electronics can thus be directly emitted to the rear part of the motor housing serving as a heat sink. A connection over a large surface area or with the aid of heat-conducting adhesives can be advantageously provided here.

For effective acceptance of the heat by the cooling air flow inlet openings in a face area of the rear part of the motor housing can be provided to introduce the cooling air flow into the motor housing. Cooling elements are arranged on or in the inlet openings. For example the inlet openings are formed by spaced cooling elements, especially cooling fins. Especially good results are achieved if the cooling elements are embodied as free-standing cooling fins, with the inlet openings been located between the cooling fins or the cooling fins passing through the inlet openings or dividing them.

In addition the rear part of the motor housing features cooling elements arranged outside the interior of the motor on its radial outside edge which serve as additional heat sinks for the heat losses of the motor electronics introduced into the interior of the motor housing. The position of these cooling elements is matched to the position of the air outlet gap opposite the edge of the wheel hub in such a way that the cooling air flow exiting through the air outlet gap reaches these cooling elements by a direct path. The cooling air flow exiting through the air outlet gap is thus used a further time for additional cooling of the electronics. The cooling elements here are possibly cooling pins arranged in a ring around the circumference of the back of the rear part of motor or on a flange edge provided. Other geometrical forms can be selected depending on the requirements of the installation environment.

The advantages of the object in accordance with the invention lie above all in the fact that the paths for removing of the heat losses from the components generating the heat to the first cooling elements in or on the air inlet openings are kept very short and that the cooling air flow both on entry into the interior of the motor housing and also on exit from the air outlet gap running around the edge of the housing accepts heat losses from the cooling elements of the rear part of the motor housing arranged there in the cooling air flow, directs it into the environment and thereby cools the electronics module twice.

Further advantages can be achieved by arranging the electronics inside the motor housing. This means that the electronics is at least protected from major environmental effects without needing a separate cover. In addition an extra encapsulation of the electronics can be provided which on the one hand serves to provide additional protection for the components within it and on the other hand ensures that the heat losses generated by electronics are not emitted into other areas of the electric motor but are removed directly at the rear part of the motor housing and from there can be transported away by the cooling air flow.

Outlet openings are provided in a side of the electric motor housing opposite the inlet openings in a front part of the motor housing facing the fan wheel, preferably the fan wheel-side bearing end housing of the electric motor, through which the cooling air flow exits from the interior of the motor housing.

In a further advantageous embodiment the arrangement of the inlet openings of the interior of the motor housing and that of the outlet openings of the front part of the motor housing is selected and when necessary matched so that the cooling air flow can flow as much as possible in parallel to the axis of rotation of the rotor in the motor housing, through the motor and out of the motor housing again. This guarantees that the flow of cooling air through the electric motor is as unobstructed as possible. In this way the air flow is not slowed down or hindered by additional changes in direction. This allows a greater air throughput and a high speed of flow for the cooling air flow, which in its turn further improves extraction of heat.

For further improvement of good heat conductance and efficient heat dissipation to the cooling air flow the motor housing is advantageously manufactured in this case from alloy casting, for example aluminum diecast parts. The use of diecast parts does allow a comparatively complicated housing geometry for optimizing cooling which would not be possible if conventional punch-bend parts or deep drawn housings were used. In this way it is possible to almost have freedom in the design of the housing as well as the cooling element geometry and its arrangement and to form the cooling elements in one piece which the relevant housing part from the same good heat-conducting material in one operation.

After it leaves the interior of the motor housing the cooling air flow is initially directed radially outwards in the air gap formed between the inside of the fan hub and the outside of the front of the motor housing and then along the outer wall of the motor housing until it comes out again into the environment through the ring-shaped air outlet gap.

The fan wheel hub which encloses the front part of the motor housing at least partly in the form of a bowl is in this case equipped on its inner side with essentially radial stiffening ribs which extend along the air gap. These stiffening ribs act as air scoops up when the fan wheel is turning which catch the cooling air flow on exit from the motor housing and accelerate the air mass radially.

Of further advantage here is matching up the shape of the internal geometry of the fan wheel hub and the motor housing parts. The contour of the stiffening ribs formed into the fan wheel hub in this case follows the contours of the motor housing in an axial direction preferably in such a way that between the fixed motor housing and the turning stiffening ribs there is as small as possible a clearance with a constant gap in order to catch the cooling air flow coming out of the interior of the motor housing as completely as possible and to increase the speed of flow as efficiently as possible. This effect can be additionally enhanced if the stiffening ribs do not run radially straight outwards but are additionally bent or in a spiral form similar to the fan blades of a radial fan and thus additionally boost the air flow in the manner of a radial fan. This type of advantageous design of the shape and path of the stiffening ribs which operate at the same time as air scoops means that the air flow is further increased through the interior of the motor and the cooling effect thereby amplified.

An extension of the stiffening ribs beyond the edge of the fan hub leads in this case to eddying of the cooling air flow exiting from the ring-shaped air outlet gap and thereby to an improved cooling of the cooling elements of the rear part of the housing arranged in the exit area of the air outlet gap. An especially good cooling effect is achieved when as many stiffening ribs as possible are accommodated in the fan wheel hub. In addition to the particular embodiment of the motor housing the particular design of the fan wheel hub is thus also used for an improved cooling of the thermally-sensitive components.

The cooling fan is preferably arranged in a surrounding frame such that direction of the cooling air current from the fan inlet openings at the rear through the electric motor and out of the air exit gap is ensured such that no "short circuit" of the cooling air can occur. This always guarantees a directed cooling air flow and from the inlet openings through to the outlet openings through the air gap to the exit from the air gap without already heated cooling air being able to be sucked in once more at the rear of the motor.

Advantageously the motor is mounted in a frame such that the air inlet side and the air outlet side are separated by the frame, for example by a frame ring which serves at the same time to accommodate the electric motor. This prevents an obstacle-free mixing of the cooling air flow entering into the motor housing with the warmed air leaving the motor housing and guarantees a lower exit temperature of the cooling air flow.

In a further embodiment of the invention a brushless electric motor with a permanently-excited internal rotor and an external electrically-excited stator winding is used to drive the cooling fan. By the contrast with an electric motor with electrically-excited internal rotor, when the electrically-excited external stator is used, waste heat generated by the stator winding can also be removed directly from the motor housing. The heat transfer is thus significantly improved in comparison to a permanent magnet-excited external rotor.

When the cooling air flow flows through the air gap between the front of the motor housing and the inside of the fan wheel hub it passes over the outside of the motor housing, in which case the heat losses, particularly those of the stator package, are emitted into the cooling air flow. This means that the power take-off front part of the housing also acts as a heat sink. Since the removal of the heat losses from the outside of the front part of the motor housing very much depends on the speed of flow of the air flow, it is advantageous to design the air gap a cross section such that this is not expanded in the direction of the cooling air flow. This is achieved for example by a gap between the fan wheel floor and the fan wheel hub and the front part of the motor housing which remains essentially the same.

In addition the outside wall of the motor housing which limits the air outlet gap can feature additional cooling elements, especially cooling ribs, to increase the heat dissipating surface. This means that when the cooling air flow flows through the surrounding air gap more waste heat is captured and removed. These cooling elements also simultaneously contribute to creating eddies in the cooling air flow, since the fan hub is revolving relative to the fixed power take-off side part of the housing.

In addition to the preferred embodiment of the motor housing, the structure of the stator is also used in a further embodiment of the invention for improved cooling. This involves winding the individual teeth of the spaced stator teeth. The cooling air flow can thus be routed on a direct path though the slots between the stator teeth and past the winding. In this case the cooling air flow already captures waste heat from the stator package within the interior of the motor. It is especially advantageous in this case for the position of the inlet openings and the geometry or orientation of the cooling elements in the area of the inlet openings to be matched to the position of the stator teeth in such a way that the cooling air flow is routed directly to the winding of the stator teeth.

BRIEF DESCRIPTION OF THE SEVERAL VIEWS OF THE DRAWINGS

The present invention and also advantageous embodiments thereof is described below with reference to an exemplary embodiment which is explained at greater length with the aid of drawings. The drawings show.

DETAILED DESCRIPTION OF THE INVENTION

Within the figures the same reference symbols are used to indicate parts with the same name and the same function.

Figure 1:
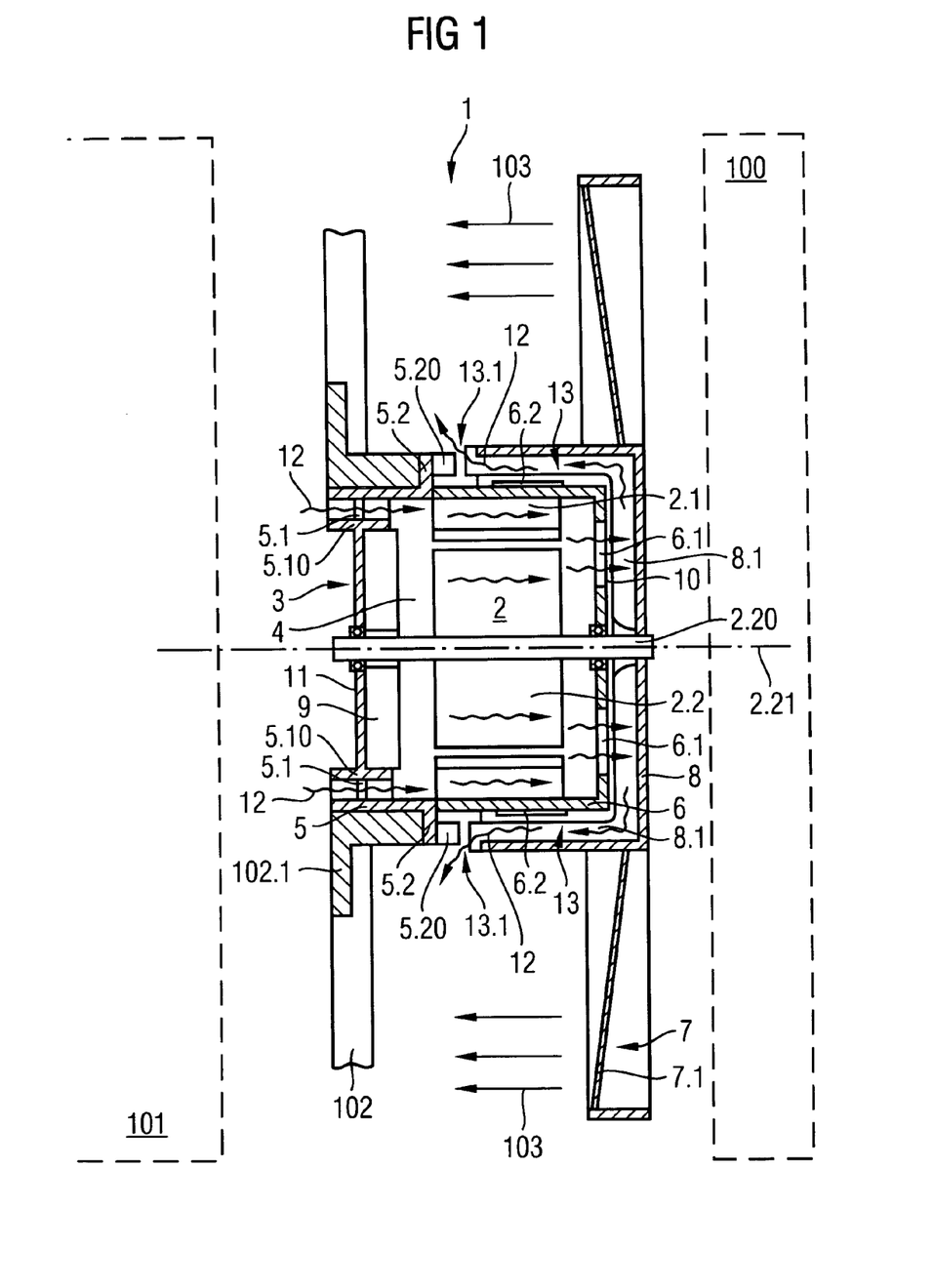
FIG. 1 a simplified schematic diagram of a cooling fan for a motor vehicle in accordance with the invention, FIG. 2 a perspective diagram of the a lower part of a motor housing with the electronics module attached to it, FIG. 3 an internal perspective view of a power take-off-side front part of a motor housing with individual tooth-wound stator and permanent magnet-excited internal rotor, FIG. 4 an external perspective view of an electric motor with a cooling elements seen from the front of the housing, FIG. 5 a perspective diagram of the inner side of a fan wheel hub with stiffening ribs arranged on it, FIG. 6 a further external perspective view of an electric motor with cooling elements, seen from the side.

FIG. 1 shows an exemplary embodiment of a cooling fan, as is used in a motor vehicle for example, as a greatly simplified schematic diagram. This diagram shows a cooling fan arranged between a heat exchanger 100 indicated by a broken line, and an internal combustion engine 101 indicated in the same manner. As its drive, the cooling fan 1 features an electric motor 2 with a stator 2.1 and a rotor 2.2 which are surrounded by a motor housing 3. The motor housing 3 enclosing the interior of the motor housing 4 essentially consists of a rear motor housing part 5 with integrated electronics module 9 and of a front power take-off motor housing part 6 connected to the rear motor housing part 5. All parts of the motor housing are made of cast aluminum in this case. The motor housing 3 is held in a fan frame 102 which is used for installing the cooling fan 1 in the engine compartment of the motor vehicle. A fan wheel 7 with a fan wheel hub 8 and fan blades 7.1 is provided on the power take-off front part of the motor housing. When the cooling fan 1 is in operation the rotating fan wheel 7 creates a pressure difference between the rear end 11 and the front end 10 of the electric motor 2. This generates a main air flow 103 to cool the internal combustion engine 101.

At the same time a cooling air flow 12 is generated by the fan wheel, especially the fan wheel hub 8, which is directed through the rear part of the motor housing 5 into the interior of the motor housing past stator 2.1 and through the front part of the motor housing 6 and the air gap 13 between fan wheel hub 8 and motor housing front part 6 along the housing side wall 6.2 to the cooling pins of the rear part of the motor housing 5. The cooling air flow is used in this case to capture waste heat of the motor components and take it away in the main air flow 103, thereby cooling the electric motor 2.

Figure 2:
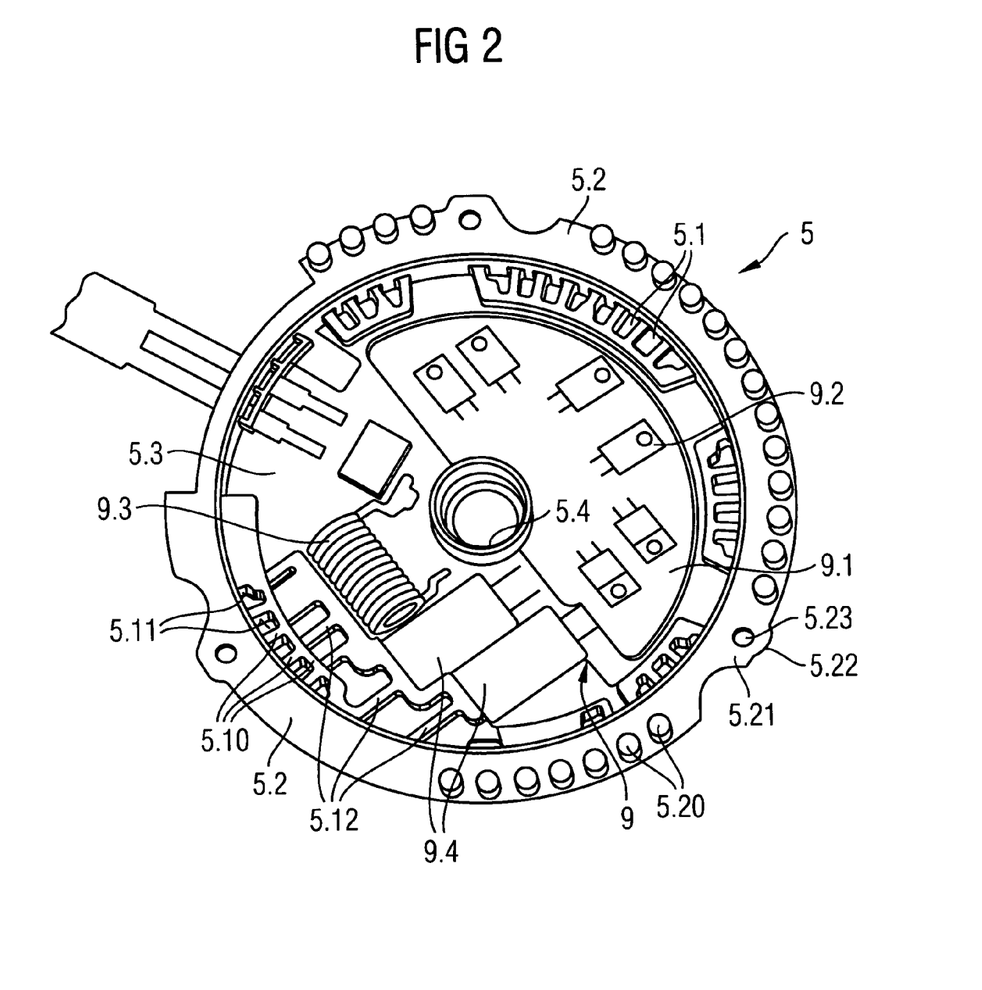

A more detailed internal review of the back of the rear part of the motor housing is shown in FIG. 2. it has a ring-shaped radial outer edge which comprises a housing floor 5.3. set down into the outer edge and thus forming a basic dish shape. The housing floor features a bearing seat 5.4 arranged centrally within it for a rotor shaft bearing 2.23 so that the rear part of the motor housing 5 simultaneously acts as an end plate. Attached to the housing floor 5.3 is an electronics module 9 containing the microelectronics. The electronics module 9 includes items such as a circuit board 9.1 with power transistors 9.2, a coil 9.3 and capacitors 9.4. The circuit board 9.1 can be covered by a cover (nor shown). The electronics module 9 is connected to the housing floor 5.3 so as to conduct heat, so that any waste heat produced is removed directly into the housing floor 5.3.

In the area where the housing floor 5.3 joins the radial out-side edge 5.2 the housing floor 5.3 features inlet openings 5.1 for the cooling air flow 12 running in the direction of the motor axis. These edge areas of the inlet openings 5.1 are designed so that cooling elements 5.10 running radially in the form of a ring are embodied with heat conducting surfaces 5.11 extending around the axis of the motor, which can be referred to as cooling fins 5.10. These cooling fins 5.10 simultaneously act as heat conductors to remove the waste heat of the electronics module 9 into the radial outside edge 5.2 of the rear part of the motor housing 5. The inlet openings 5.1 are grouped together, with the groups being separated from each other by areas of the housing floor 5.3 without breakthroughs.

In FIG. 2 the cooling air flow thus enters through the inlet openings 5.1 in the direction towards the viewer into the interior of the motor 4, with the rear part of the motor housing 5 also being used as a heat sink for the electronics module 9.

For explicitly routing heat away from components of the electronics module 9 producing a lot of heat via the housing floor 5.3 to the cooling fins 5.10 and into the radial external edge 5.2 of the rear part of the motor housing 5 collections of material are arranged in the housing floor 5.3 as heat conducting bars 5.12. Some of these heat conducting bars 5.12 are in direct contact with the components of the electronic module 9 generating the heat. Simultaneously these collections of material increase the heat capacity of the rear part of the motor housing and thereby its buffer capacity in relation to thermal peak loads.

On the radial outside edge there are flanges 5.22 featuring installation surfaces 5.21 with connecting holes 5.23 for embodying screw connections to the front part of the housing 6. These screw connections are used to connect the rear part of the motor housing 5 to the drive take-off side front part of the motor housing 6.

Figure 3:
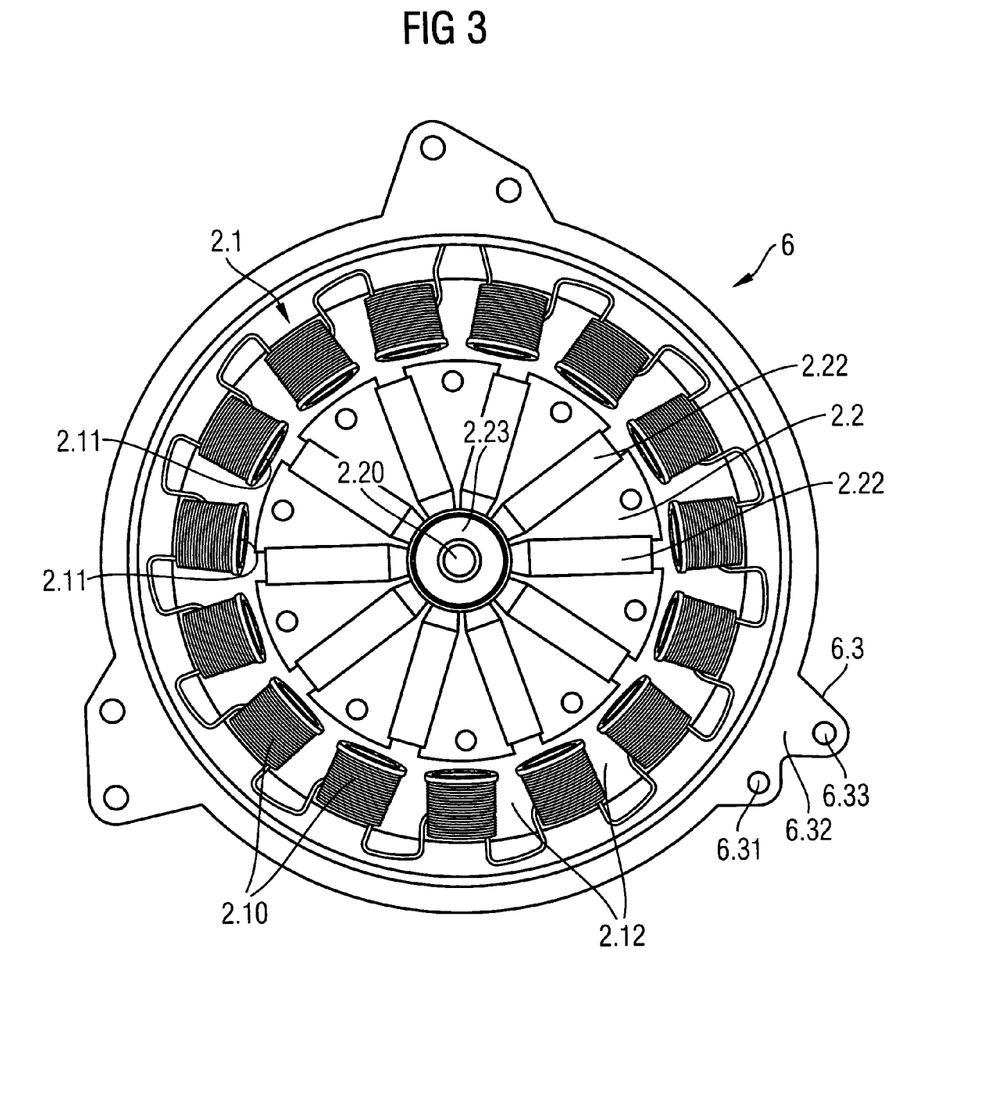

FIG. 3 shows an internal view of the drive take-off front part of the motor housing 6. The flanges 6.3 mounted on the edge on the one hand feature connecting holes 6.31 for embodying screw connections with the rear part of the motor housing 5. In the assembled state the mounting surfaces 6.32 of the front part of the motor housing 6 lie on the corresponding mounting surfaces 5.21 of the radial outside edge 5.2 of the rear part of the motor housing 5. On the other hand there are attachment holes drilled in the flanges 6.3 for mounting the electric motor 2, for example in a motor mounting ring of the fan frame 102 (not shown in FIG. 3).

The electric motor 2 features a rotor 2.2 arranged in the drive take-off front part of the motor housing 6 with permanent magnets 2.22 arranged in the form of spokes, in the middle of which the rotor shaft 2.20 is arranged. The stator 2.1 concentrically surrounding the rotor is constructed from a laminated core made up of individual laminations. Stator teeth 2.11 with intermediate slots 2.12 are embodied on the internal circumference of the laminated core. The stator teeth 2.11 are provided with individual teeth windings 2.10, which do not cause winding overhangs to be formed in the direction of the rotor axis. The cooling air flow 12 is routed from the inlet openings 5.1 in the back of the rear part of the motor housing 5 directly in the direction of the gaps 2.12 between the stator teeth 2.11 and while flowing through the gaps 2.12 captures waste heat from the windings 2.10. To this end the inlet openings (5.1) for cooling air flow (12) in the housing floor 5.3 of the rear plate 11 of the rear part of the motor housing 5 are arranged with essentially the same radial gap to the rotor axis as the stator teeth 2.11 with the individual tooth windings 2.10 and are arranged directly adjacent to the gaps 2.12.

Figure 4:
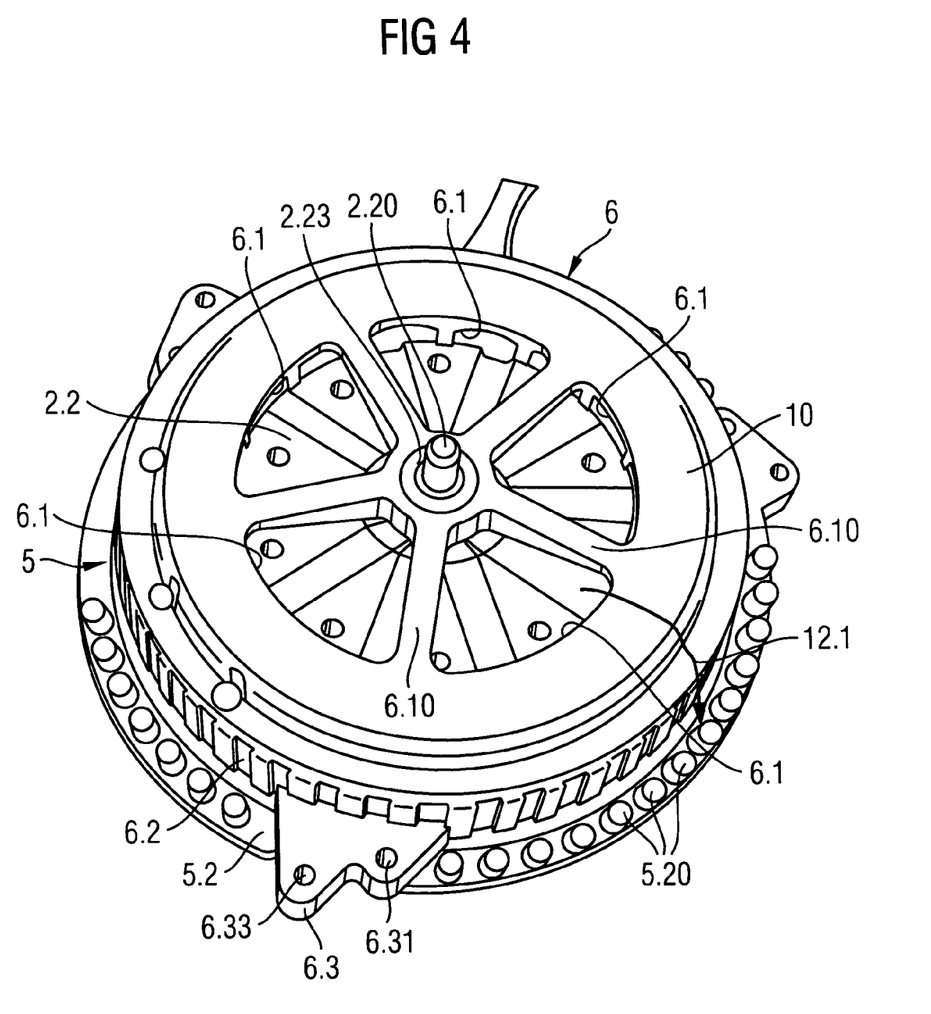

FIG. 4 shows the external view of a electric motor from the front of the motor 10. The front part of the motor housing 7 corresponds to that shown in FIG. 3, but is viewed from a different direction. In this diagram the front part of the motor housing 7 is already placed on the rear part of the motor housing 5. The front part of the motor housing 6 is embodied as a power take-off side end plate and features a centered rotor shaft bearing 2.23 on which the rotor shaft 2.20 is supported. The front part of the motor housing 6 essentially consists here of a front plate of the motor housing 10 lying opposite the housing floor 5.3 of the rear part of the motor housing 5 and of a surrounding side wall of the housing 6.2. extending in an axial direction to the rotor (cf. FIGS. 1 and 6). The front plate 10 of the front part of the motor housing 6 features five outlet openings 6.1. The five separate circle segment-shape outlet openings 6.1 together form an opening in the front plate of the motor housing 10 which is circular in cross-section and interrupted by the carrier bars arranged as spokes 6.10 which approximately corresponds to the diameter of the rotor 2.2.

The cooling air flow 12 coming from the gaps 2.12 escapes from the interior of the motor housing 4 through the outlet openings 6.1 and passes in flow direction 12.1 over the front plate of the motor housing 10 and the housing side wall 6.2, in which case it captures heat energy from the motor components.

Figure 5:
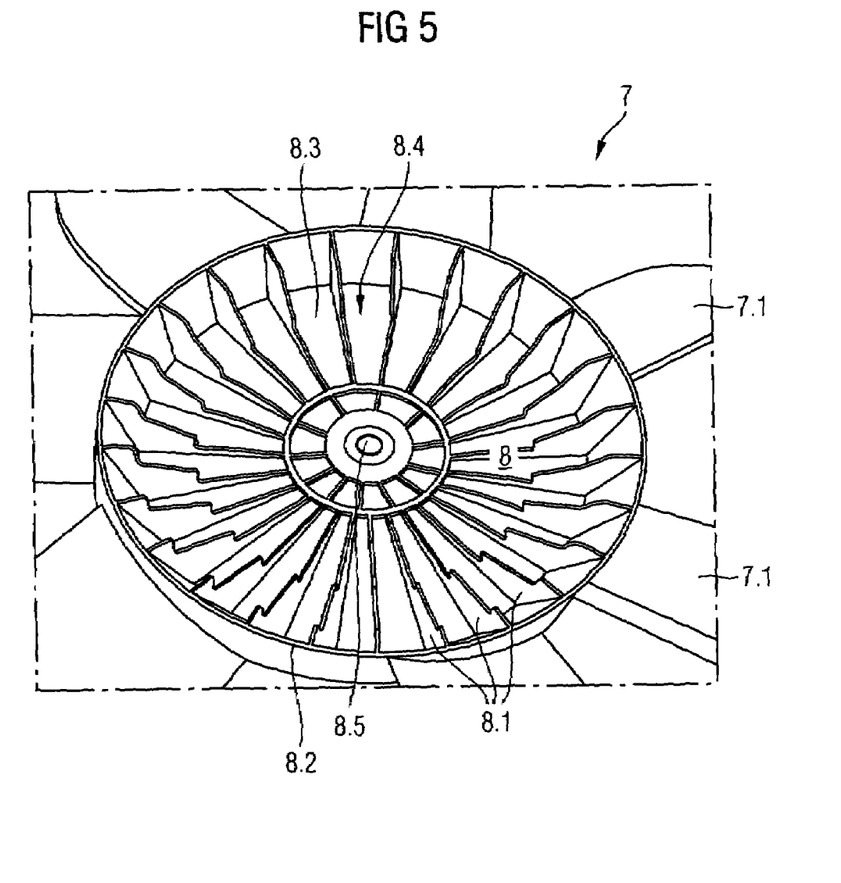

The front part of the motor housing 6 is surrounded in the shape of a bowl or a bell by the fan wheel hub 8, of which the inner side 8.4 is shown in FIG. 5. Attached to the fan wheel hub 8 are the fan blades 7.1 for generating the main air flow 103 for cooling the internal combustion engine (not shown in FIG. 4) of the motor vehicle. In the middle of the fan hub 8 a rotor shaft coupling 8.5 is provided for the rotor shaft 2.20. Extending outwards from this are stiffening ribs 8.1 running radially outwards and mounted on the floor of the hub 8.3. The stiffening ribs 8.1 in this case approximately follow the contour of the front part of the motor housing 6 and are arranged at a short distance from the outside of the housing. In the operating state this produces a quasi-surrounding air gap between the drive take-off front part of the motor housing 6 and the inner side of the fan hub 8.4. The stiffening ribs 8.1 then divide up the air gap 13 in the circumferential direction and operate as air scoops when the fan wheel 7 rotates, which establish or at least amplify the cooling air flow 12 through the interior of the motor housing 4. In a further embodiment the stiffening ribs 8.1 can also run outwards in the form of a sickle, arc or spiral from the center of the fan wheel hub 8 to the edge of the fan hub 8.2.

The cooling air flow 12, after exiting via the outlet openings 6.1 from the interior of the motor housing 4, passes between fan wheel hub 8 and front part of the motor housing 6 over the motor housing front plate 10 of the drive take-off end plate and the housing side wall 6.2 and finally exits from the fan 1 through the air outlet gap 13.1 (cf. FIG. 1). The drive take-off side front part of the motor housing 6 is thus simultaneously used as a heat sink for the stator 2.1.

Figure 6:
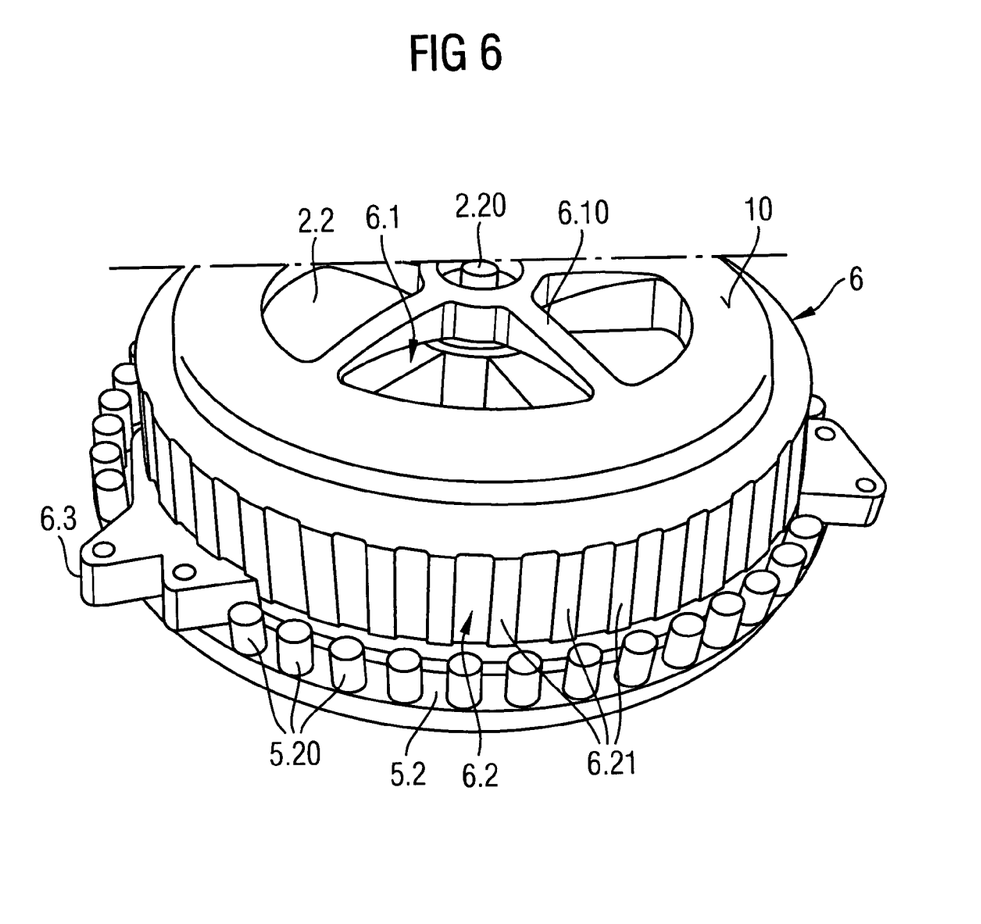

The fan wheel hub 8 is attached to the rotor shaft 2.20, as shown in FIGS. 4 and 6. The air outlet gap 13.1 (cf. FIG. 1) is thus formed between the side housing wall 6.2 and the inside 8.4 of the fan hub 8. The housing side wall 6.2 delimiting the air outlet gap 13.1 features external cooling ribs 6.21 running in the rotor axial direction to amplify the heat-dissipating surface, which simultaneously contribute to forming eddies in the cooling air flow.

As can be seen from FIG. 6, the housing front plate 10 features a stepped contour. The stiffening ribs 8.1 in the fan hub 8 (cf. FIG. 5) are formed accordingly so that a corresponding contour shape is formed. In operation the cooling air flow 12 will be taken up by the stiffening ribs 8.1 and accelerated by the rotation of the fan wheel hub 8 on exit from the outlet openings 6.1. The centrifugal force simultaneously produces an acceleration of the air mass in the radial direction. This accelerates the cooling air flow 12 directed away from the rotor axis in flow direction 12.1.

The stiffening ribs 8.1 can in a specific version be extended in the rotor-axial direction as well as additionally in a radial direction beyond the outside edge 8.2 of the fan hub 8, which leads to an eddying of the escaping cooling air flow and to an improved heat capture by the cooling air flow at the cooling elements.

Directly opposite the air outlet gap 13.1 (cf. FIG. 1) cooling pins 5.20 are provided on the radial outside edge 5.2 of the rear part of the motor housing 5. These cooling pins 5.20 are arranged distributed over the radial outside edge 5.2 of the back of the rear part of the motor housing 5 and aligned axially in the direction of air outlet gap 13.1 (cf. FIGS. 2, 4 and 6). The cooling pins 5.20 are embodied in one piece with the radial outside edge 5.2 and through their mass increase the capacity of the rear part of the motor housing 5 to accept waste heat from the electronics module 9. At the same time their pin form means that they enlarge the heat emitting surface of the rear part of the motor housing 5. The described arrangement means that the cooling pins 5.20 are located opposite the air outlet gap 13.1 and have the cooling air flow 12 which escapes through this gap and has been eddied by the opposite stiffening ribs 8.1 passing over them. In this case heat is taken away from the cooling pins 5.20 into the cooling air flow 12 passing over them and out into the environment. This means that the cooling air flow 12 is used one more time on its path for cooling the electronic components. Through the rotational motion of the fan wheel 9 the heated waste air of the electric motor 2 is then fed into the main air flow 103 for the internal combustion engine.

What is claimed is:

1. A cooling fan, comprising:
    an electric motor comprising a stator, a rotor, a multi-part motor housing and an electronics module, wherein the motor housing arranged to form at least a motor front plate facing a front direction and a rear part of the motor housing facing away from the front direction and forming a rear plate of the motor;
    a fan wheel located in front of the electric motor, the fan wheel comprising a bowl-shaped fan wheel hub arranged so as to turn with the rotor and enclose the motor housing axially and radially spaced at least partly in a bowl shape such that between an outside of the motor housing and an inside of the fan wheel an air gap is formed in which protrusions of the fan wheel hub inner side extend thereby operating as air scoops;
    the fan wheel hub arranged so as to rotate with the rotor and create a pressure difference between the rear side and the front side of the electric motor; and
    the electronics module attached directly to the rear part of the motor housing so as to conduct heat, the rear part of the motor housing arranged to act as a heat sink to remove the heat energy generated by the electronics module and emit the heat energy into a stream of cooling air created by the difference in pressure, and
    first cooling elements arranged in and/or on inlet openings in the rear of the motor so as to be cooled by the cooling air flow on entry into the interior of the motor housing and on the radial outside edge of the rear part of the motor housing in the outlet area of an air outlet gap formed by the fan wheel hub running around an edge of second cooling elements arranged to be cooled by the cooling air flow on exit from the air outlet gap.

2. The cooling fan according to claim 1, wherein the electronics module is arranged within the housing of the electric motor.

3. The cooling fan according to claim 1, wherein the inlet openings for the cooling air flow are arranged in the rear plate of the rear part of the motor housing and the assigned cooling elements are arranged and embodied so that the cooling air flow enters the motor housing essentially parallel to an axis of rotation of the rotor.

4. The cooling fan according to claim 1, wherein the front plate of the front part of the motor housing comprises outlet openings for the cooling air flow through which the cooling air flow exits from the interior of the motor housing essentially in parallel to the axis of rotation of the rotor.

5. The cooling fan according to claim 1, wherein the rear part of the motor housing is made of an alloy and the cooling elements of the rear part of the motor housing are embodied in one piece with and from material of the rear part of the motor.

6. The cooling fan according to claim 1, wherein the fan wheel hub comprises protrusions on its inner side which runs straight or bent in a radial direction and matched axially to a contour of the motor housing with a small gap, and further arranged to act as stiffening ribs for the fan wheel hub and operate as air scoops and amplify the cooling air flow.

7. The cooling fan according to claim 1, wherein the electric motor further comprises a permanent magnet-excited inner rotor arranged on a rotor shaft and a stator designed with individual tooth windings and connected with the motor housing so that the stator conducts heat.

8. The cooling fan according to claim 7, wherein the inlet openings for the cooling air flow in the rear plate of the rear part of the motor housing are arranged with essentially a same radial gap to the rotor axis as the individual tooth windings of the stator, so that the cooling air flow entering the interior of the motor housing comes directly onto the individual tooth windings of the stator.

9. The cooling fan according to claim 7, wherein an outside of the front part of the motor housing comprises, at least in areas in the air gap passed over by the cooling air flow, protrusions to increase a surface which is passed over by the cooling air flow.

10. The cooling fan according to claim 9, wherein the protrusions are cooling ribs.

* * * * *